(12) United States Patent
Kalwara et al.

(10) Patent No.: US 8,567,143 B2
(45) Date of Patent: Oct. 29, 2013

(54) FORTIFIED FLASHING LAMINATE

(75) Inventors: Joseph John Kalwara, Indianapolis, IN (US); Hao Wang, Carmel, IN (US)

(73) Assignee: Firestone Buiding Products Company, LLC, Indianapolis, IN (US)

( * ) Notice: Subject to any disclaimer, the term of this patent is extended or adjusted under 35 U.S.C. 154(b) by 0 days.

(21) Appl. No.: 13/351,671

(22) Filed: Jan. 17, 2012

(65) Prior Publication Data

US 2012/0204508 A1    Aug. 16, 2012

Related U.S. Application Data

(60) Provisional application No. 61/442,889, filed on Feb. 15, 2011.

(51) Int. Cl.
   *E04C 1/00* (2006.01)
(52) U.S. Cl.
   USPC ............... 52/309.3; 52/309.1; 52/309.13
(58) Field of Classification Search
   USPC ............. 52/309.3, 309.1, 309.13–309.16
   See application file for complete search history.

(56) References Cited

U.S. PATENT DOCUMENTS

| | | | |
|---|---|---|---|
| 4,404,056 A * | 9/1983 | Kakehi et al. | 156/244.11 |
| 4,852,323 A * | 8/1989 | Kartfilt | 52/410 |
| 4,934,117 A | 6/1990 | Barksdale | |
| 4,965,119 A * | 10/1990 | Sancaktar | 428/192 |
| 5,204,148 A | 4/1993 | Alexander et al. | |
| 5,419,666 A * | 5/1995 | Best | 411/373 |
| 5,800,891 A * | 9/1998 | Wasitis | 428/42.2 |
| 5,804,661 A | 9/1998 | Davis et al. | |
| 6,291,542 B1 | 9/2001 | Hubbard et al. | |
| 7,662,886 B2 | 2/2010 | Park | |
| 2007/0101664 A1 * | 5/2007 | Hoy et al. | 52/198 |

OTHER PUBLICATIONS

Co-pending U.S. Appl. No. 13/351,577, filed Jan. 17, 2012; 20 pages.

* cited by examiner

*Primary Examiner* — Mark Wendell
(74) *Attorney, Agent, or Firm* — Jason A. Houser; Arthur M. Reginelli

(57) ABSTRACT

A fortified flashing laminate including a polymeric layer having an uncured portion and a cured portion forming a fortified area. The fortified area strengthens the flashing laminate at an area of known vulnerability or increased stress to prevent damage to the flashing laminate during installation and prior to curing of the remainder of the polymeric layer. The fortified flashing laminate may also include a layer of adhesive tape covering at least a portion of the bottom surface of the polymeric layer.

36 Claims, 7 Drawing Sheets

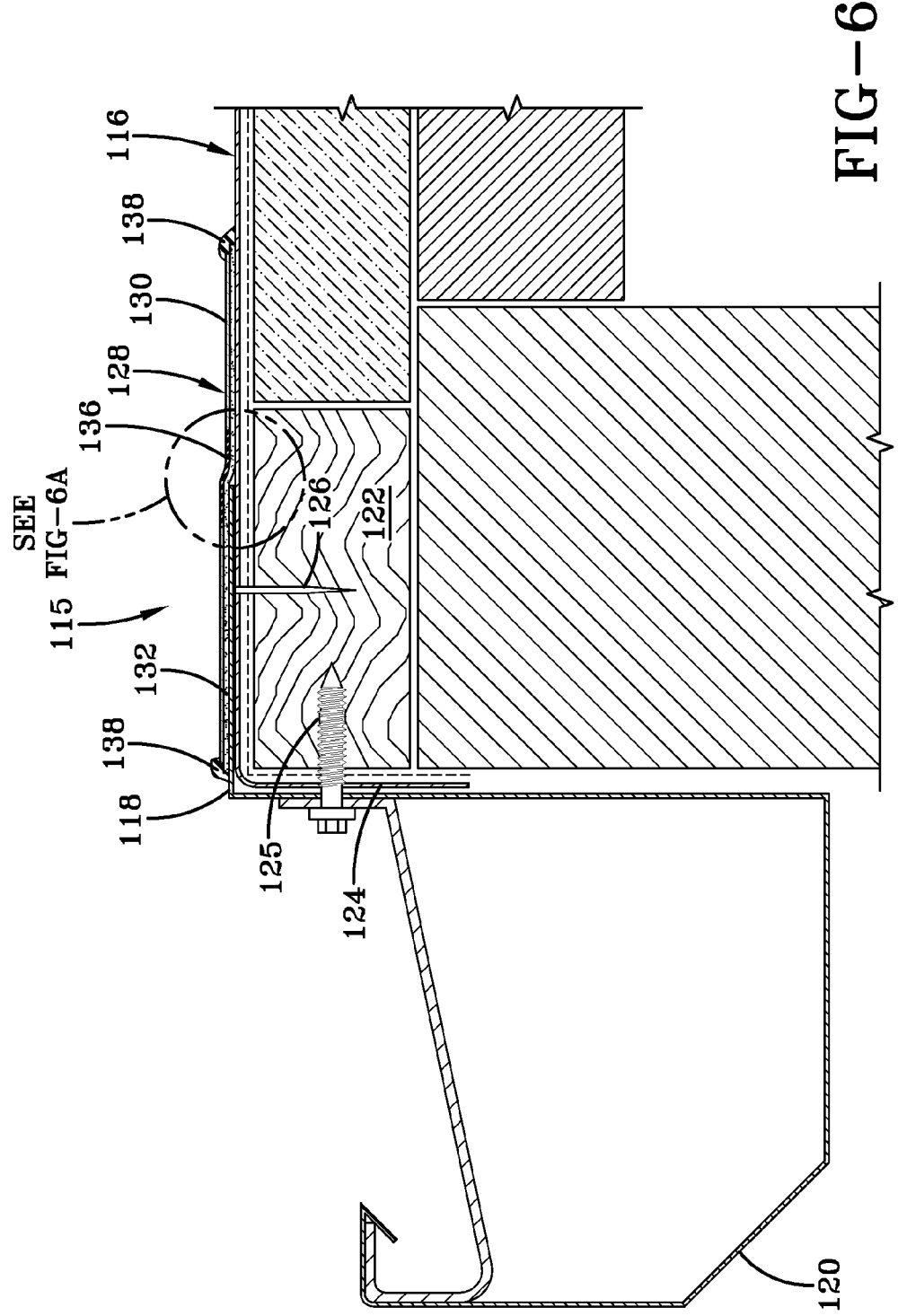

FORTIFIED FLASHING LAMINATE

This application claims priority from U.S. Provisional Patent Application Ser. No. 61/442,889 filed on Feb. 15, 2011, which is incorporated herein by reference in its entirety.

FIELD OF THE INVENTION

One or more embodiments of the present invention relate to a fortified flashing laminate for installation in a roofing system. In one or more embodiments, the fortified flashing laminate may include a selectively cured polymeric layer having a cured portion at one or more vulnerable areas of the flashing laminate.

BACKGROUND OF THE INVENTION

The construction industry commonly uses single ply membranes to provide a waterproof barrier on flat or low-slope roofs. It is prohibitively expensive and difficult to produce and transport a single membrane that is sized to cover an entire roof surface, thus, a plurality of individual membranes are provided and oriented in an overlapping arrangement. The overlapping portions, or splices, of these individual membranes must be secured together to ensure that the plurality of membranes form a single waterproof surface.

In many cases, flashings are used to seal certain locations of the roofing membranes where the membranes meet, such as corners or walls. One type of flashing used is referred to as a tape flashing, which is a laminate and may include a polymeric layer of thermosetting flashing material (i.e., EPDM) laminated to a layer of vulcanized tape adhesive. The polymeric layer may be provided in an uncured state and then cured by exposure to heat over time after being installed on the roof. Alternatively, the polymeric layer of the tape flashing laminate may be provided in a cured state prior to installation.

The polymeric layer of the flashing laminates are formable when in the uncured state, which facilitates installation of the flashing laminate by allowing it to better conform to the underlying surfaces (e.g. corners). However, these uncured flashing laminates are susceptible to punctures, slits, cuts and impact damage, as well as damage caused by building movement and/or wall movement prior to curing of the polymeric layer. When provided in a cured state, the polymeric layer is more durable and resistant to damage, but is difficult to mold to conform to the underlying surfaces of the roofing assembly.

Flashing laminates are often provided in specific sizes and shapes designed for installation at specific locations or edges of the membrane. For example, flashing laminates may include those intended for installation at an outer corner of vertical walls, at the base of curb surfaces, around penetrations through the roofing system, and at a metal flashing, such as a gravel stop, provided at the edge of the roof surface. Certain areas of these flashing laminates are particularly vulnerable to damage while the flashing is in an uncured state. Specifically, the areas where the flashing laminate transitions from a horizontal surface to a vertical surface are particularly vulnerable. In addition, areas at the outer corners of vertical surfaces can also be vulnerable to damage during installation of the flashing tape.

U.S. Pat. No. 6,291,542 discloses a method and apparatus for selectively curing a sheet of ethylene-propylene diene termonomer (EPDM) material to form a roofing membrane for installation on a roof deck. The method includes the steps of providing a sheet formed of EPDM, the sheet having a field and longitudinal edge areas bordering the field; and then simultaneously shielding at least one edge area of the EPDM sheet and exposing at least the field of the EPDM sheet to radiation to cure at least the field of the EPDM sheet, while retaining at least one uncured edge area. An object of the invention is to facilitate splice seaming between adjacent roofing membranes by providing uncured edge areas of the membrane, thereby eliminating a need for adhesives. This method and apparatus does not contemplate selective curing of portions of flashings at vulnerable areas.

Thus, there is a need for an improved flashing laminate that reduces the risk of damage to the flashing during installation and during the curing period without appreciably affecting the formability of the flashing laminate.

SUMMARY OF THE INVENTION

One or more embodiments of the present invention provides a fortified flashing laminate including a polymeric layer having an uncured portion and a cured portion forming a fortified area; and a layer of adhesive tape covering at least a portion of said bottom surface of said polymeric layer.

One or more embodiments of the present invention also provides a roof assembly including a roofing membrane secured over a roof deck; and a flashing laminate including a thermosetting polymeric layer having a top surface and a bottom surface, and including an uncured portion and a cured portion that forms a fortified area, and a layer of adhesive tape covering substantially all of said bottom surface of said polymeric layer, wherein said fortified area of said flashing laminate is positioned at the seam between said curb flashing and said roofing membrane.

One or more embodiments of the present invention also provides a method of making a flashing laminate including the steps of forming a polymeric sheet having a top surface and a bottom surface; selectively curing a portion of the polymeric sheet to form a cured portion; and laminating a layer of vulcanized adhesive tape to the bottom surface of the polymeric sheet.

One or more embodiments of the present invention also provides a fortified flashing laminate including a vulcanizable polymeric layer including a cured portion and an uncured portion, the cured portion forming less than approximately 50% of the polymeric layer, wherein the cured portion of the polymeric layer is characterized by a tensile strength of at least approximately 1200 PSI, and the uncured portion is characterized by a tensile strength of less than approximately 300 PSI.

BRIEF DESCRIPTION OF THE DRAWINGS

FIG. 4a is an enlarged view of a portion of the flashing laminate as indicated in FIG. 4;

FIG. 6 is a sectional view of a flashing laminate installed at a roof edge gutter guard.

DETAILED DESCRIPTION OF THE ILLUSTRATIVE EMBODIMENTS

Figure 1:
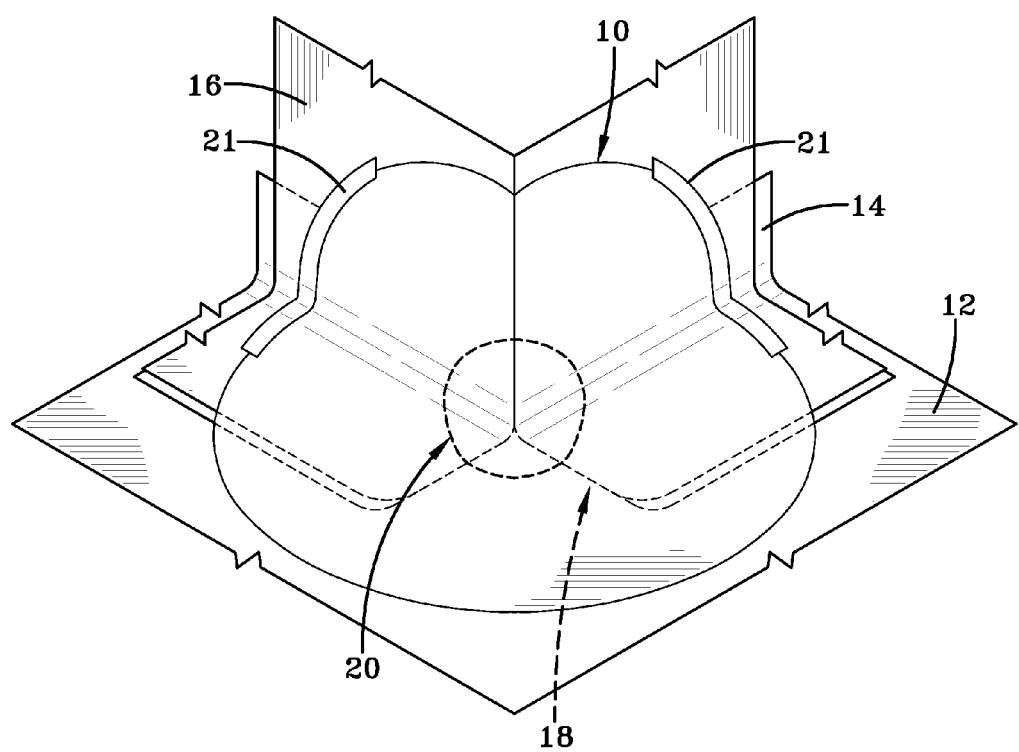
FIG. 1 is an isometric view of a corner flashing installed as part of a roofing membrane assembly.

Flashing laminates made in accordance with the present invention include a polymeric layer laminated to a vulcanized adhesive tape layer, where a portion of the polymeric layer is cured prior to installation of the flashing laminate, and the remainder of the polymeric layer is uncured. The cured portion of the selectively cured polymeric layer provides a fortified area of the flashing laminate. The cured portion provides added strength to the fortified area of the flashing laminate, which helps to reduce damage to the polymeric layer during and after installation, and prior to any substantial curing of the uncured portion, by increasing the tensile strength and puncture resistance of the flashing laminate at the area of curing. The polymeric layer may be selectively cured at specific and defined regions of the flashing laminate that are known to be vulnerable to damage when installed in certain locations in the roofing assembly.

In one or more embodiments, the cured portion of the polymeric layer may be relatively small compared to the overall size of the flashing. In certain embodiments, the cured portions of the polymeric layer may account for less than 50% of the polymeric layer, in other embodiments less than 40% of the polymeric layer, in still other embodiments less than 30% of the polymeric layer, in other embodiments less than 20% of the polymeric layer, and in yet other embodiments less than 10% of the polymeric layer.

The polymeric layer of the flashing laminate may be made from any thermosetting material (also referred to as vulcanizable or curable materials) known to those skilled in the art. Commercially available thermosetting flashing membranes may include elastomeric copolymers such as ethylene-propylene-diene copolymer (EPDM), polychloroprene based rubbers, and functionalized olefins such as chlorosulfonated polyethylene (CSPE).

As used herein, the term uncured, which may be used interchangeably with un-vulcanized and green, refers to a thermosetting material that has not been appreciably cured, vulcanized, or set. The uncured portion of the polymeric layer facilitates installation of the flashing laminate because it is formable, as opposed to cured or vulcanized flashing materials, which are not as easily formable. The uncured polymeric layer is curable after installation and after a period of exposure to heat on the roofing surface, and may thereafter be considered a cured or vulcanized flashing. As used herein, the terms uncured and green refer to the state of the polymeric layer or portions of the polymeric layer at the time of installation of the flashing laminate.

In one or more embodiments, uncured portions of the polymeric layer may be characterized by a green strength modulus at 73° F. of less than approximately 300 PSI, in other embodiments less than approximately 275 PSI, in other embodiments less than approximately 260 PSI, and in yet other embodiments less than approximately 250 PSI. In these or other embodiments, uncured portions of EPDM flashings may be characterized by a tensile strength of less than approximately 300 PSI, in other embodiments less than approximately 275 PSI, in other embodiments less than approximately 260 PSI, and in yet other embodiments less than approximately 250 PSI. In the same or other embodiments, uncured portions of EPDM flashings may be characterized by a minimum tensile set of 80%.

In one or more embodiments, cured portions of EPDM flashings may be characterized by a tensile strength of at least 1300 PSI, in other embodiments at least 1325 PSI, and in other embodiments at least 1350 PSI. In the same or other embodiments, cured portions of EPDM flashings may be characterized by a maximum tensile set of 10%.

In one or more embodiments, uncured portions of Chloroprene flashings may be characterized by a green strength modulus at 73° F. of less than approximately 100 PSI, in other embodiments less than approximately 90 PSI, in other embodiments less than approximately 80 PSI, and in yet other embodiments less than approximately 75 PSI. In these or other embodiments, uncured portions of EPDM flashings may be characterized by a tensile strength of less than approximately 100 PSI, in other embodiments less than approximately 90 PSI, in other embodiments less than approximately 80 PSI, and in yet other embodiments less than approximately 75 PSI. In the same or other embodiments, uncured portions of Chloroprene flashings may be characterized by a minimum tensile set of 80%.

In one or more embodiments, cured portions of Chloroprene flashings may be characterized by a tensile strength of at least 1200 PSI, in other embodiments at least 1225 PSI, and in other embodiments at least 1250 PSI. In the same or other embodiments, cured portions of Chloroprene flashings may be characterized by a maximum tensile set of 10%.

In one or more embodiments, the polymeric layer may be selectively cured by applying heat to the portion of the polymeric layer to be cured. The amount of heat applied, and the length of exposure of the selected portion of the polymeric layer, may vary depending upon the degree of cure desired, as will be appreciated by those skilled in the art. In one or more embodiments, hot air may be used to apply heat to portions of the polymeric layer at a rate and temperature sufficient to substantially cure the selected portions. In other embodiments, a hot press or die may be used to apply heat to selected areas of the polymeric layer, thereby forming cured portions.

In certain embodiments, portions of the polymeric layer may be exposed to heat of at least 200° F. to form cured portions of the polymeric layer, in other embodiments portions of the polymeric layer may be exposed to heat of at least 250° F., in other embodiments at least 300° F., and in other embodiments at least 320° F. In one or more embodiments, the portions of the polymeric layer to be cured may be exposed to elevated temperatures for at least 15 minutes, in other embodiments at least 18 minutes, in other embodiments at least 20 minutes, and in other embodiments at least 22 minutes. In certain embodiments, the selected portions of the polymeric layer to be cured may be exposed to elevated temperatures for up to approximately 6 hours.

In other embodiments, the polymeric layer may be selectively cured by applying radiant energy to the portion of the polymeric layer to be cured. The amount of radiant energy applied, and the length of exposure of the selected portion of the polymeric layer, may vary depending upon the degree of cure desired. In still other embodiments, the polymeric layer may be selectively cured by applying additional curatives to the portion of the polymeric layer to be cured. As will be appreciated by those skilled in the art, the amount of additional curatives applied may vary depending upon the degree of cure desired.

In one or more embodiments, the polymeric layer may have a thickness of greater than 0.040 inches (1.02 mm). In other embodiments, the polymeric layer may have a thickness greater than 0.050 inches (1.27 mm). In still other embodiments, the polymeric layer may have a thickness greater than 0.055 inches (1.40 mm). In one or more embodiments, the polymeric layer may have a thickness of less than 0.080 inches (2.03 mm). In other embodiments, the polymeric layer may have a thickness less than 0.070 inches (1.78 mm). In still other embodiments, the polymeric layer may have a thickness less than 0.065 inches (1.65 mm).

In one or more embodiments, the adhesive tape of the flashing laminate of the present invention may be a vulcanized adhesive tape. In other embodiments, the adhesive tape may be an un-vulcanized adhesive tape. As used herein, vulcanized adhesive tape refers to an adhesive tape that has been cured sufficiently to give the adhesive tape a tensile strength of greater than 35 psi. The adhesive tape may be a solid adhesive, which may also be referred to as a solid adhesive strip, and may include those that are conventional in the art. In one or more embodiments, the adhesive tape may include EPDM and/or butyl rubber. In one or more embodiments, the adhesive tape includes at least 85% solids. In other embodiments, the adhesive tape includes at least 90% solids. In still other embodiments, the adhesive tape includes at least 95% solids. In yet other embodiments, the adhesive tape includes at least 99% solids.

In one or more embodiments, the adhesive tape may have a thickness of greater than 0.007 inches (0.178 mm). In other embodiments, the tape may have a thickness greater than 0.010 inches (0.25 mm). In still other embodiments, the adhesive tape may have a thickness greater than 0.015 inches (0.381 mm). In one or more embodiments, the adhesive tape may have a thickness of less than 0.100 inches (2.54 mm). In other embodiments, the tape may have a thickness less than 0.080 inches (2.03 mm). In still other embodiments, the adhesive tape may have a thickness less than 0.070 inches (1.78 mm). In one or more embodiments, the adhesive tape may cover the entire bottom surface of the polymeric layer. In other embodiments, the adhesive tape may cover substantially the entire bottom surface of the polymeric layer.

Useful adhesive tapes are disclosed in U.S. Pat. Nos. 6,120,869, 5,888,602, 5,859,114, 5,733,621, 5,612,141, 5,563,217, 5545685, 5,504,136, 5,242,727, 4,932,171, 4,849,268, 4,657,958, 4,855,172, and 4,588,637, which are incorporated herein by reference. Useful tapes are commercially available including those available under the trade names QuickSeam™ (Firestone), PLIOSEAL™ (Ashland), 510™ (ADCO), 505™ (ADCO), SecureTAPE™ (Carlisle).

The flashing laminate of the present invention may be provided in a variety of various sizes and shapes to accommodate any number of installation situations. For example, specific flashing laminates are manufactured for corner flashings where vertical surfaces form an exterior corner. A particular area that frequently provides a point of vulnerability in flashing applications is the intersection between horizontal and vertical surfaces that must be sealed. For instance, the intersection of the roofing membrane and curb flashing creates a vulnerable region where the two perpendicular surfaces intersect.

In one or more embodiments, the flashing laminate of the present invention may also include a fortified area. In certain embodiments, the fortified area is formed by selectively curing a portion of the otherwise uncured polymeric layer. The cured portion of the polymeric layer may also be referred to as a reinforcing layer. The cured portion of the polymeric layer is formed in a particular region of the flashing laminate known to be vulnerable to damage during installation and the curing period of the flashing laminate in a roofing system.

The size and shape of the fortified area may vary according to the size and shape of the flashing laminate, the intended use of the flashing laminate, and the resulting vulnerable area of the flashing laminate. The cured portion of the polymeric layer increases the overall puncture resistance of the flashing laminate when tested using Puncture Resistance Testing ASTM D4833 compared to identical flashing laminate without the cured portion. In addition, the cured portion of the polymeric layer at the fortified area increases the force necessary to extend and stretch the flashing laminate, making the flashing laminate stronger and more resistant to damage from movement when subjected to Tensile and Elongation Testing according to ASTM D412.

In one or more embodiments, a release liner may be provided over the vulcanized adhesive layer of the flashing laminate to protect the adhesive and to prevent unintended adhesion. The release liner may include a polymeric film or coated paper to which the adhesive may form a temporary bond. However, this bond can be readily broken by applying minimal tension. The release liner is easily removed by a technician immediately prior to installing the flashing laminate as part of a roofing system.

In one or more embodiments, the release liner may include a paper or cellulosic structure coated with a polymeric coating. In other embodiments, the release liner may include a homogeneous polymeric structure; for example, the release liner may include a polyester or polyolefin film. Suitable materials for the release liner include polypropylene, polyester, high-density polyethylene, medium-density polyethylene, low-density polyethylene, polystyrene or high-impact polystyrene. Such polymeric materials offer a number of advantageous properties, including high moisture resistance, good resistance to temperature fluctuations during processing and storage, high tear resistance. In one or more embodiments, these release liners may also be provided with anti-static surface coatings and/or anti-stick surface coatings. In addition to the above polymeric release liner materials, the release liner may also be made of kraft paper.

Several examples of fortified flashing laminates are provided below as illustrative embodiments of the invention. It will be appreciated by those skilled in the art that conventional installation techniques may be employed in the installation of any embodiment of the flashing laminate, despite the inclusion of a cured portion of the polymeric layer.

For instance, a primer may be applied between the adhesive tape and the surface to which it adheres to form a stronger adhesive bond. Although the primer layer is not shown or discussed in the illustrative embodiments herein, it is contemplated that a primer may be applied to an underlying contact surface and allowed to dry prior to positioning and adhering the flashing laminate. The primer may be solvent based, and in one or more embodiments polymeric material may be suspended or dissolved in the solvent. In one or more embodiments, the primer may be less than 20 percent solids. In other embodiments the primer may be less than 16 percent solids. In still other embodiments the primer may be less than 10 percent solids. In one or more embodiments the polymeric material may include polymer tacifying resins. Examples of suitable solvent based primers may include Firestone QuickPrime Plus, Firestone QuickPrime Plus LVOC, ADCO SPC-3, Ashland PLIOSEAL™ 9705.

Referring now to FIG. 1, an embodiment of a flashing laminate is shown, and is generally indicated by the numeral 10. Flashing laminate 10 is a corner flashing laminate and is installed at the intersection of an exterior corner of vertical walls and the horizontal roof surface. A roofing membrane 12 is positioned over the roof surface and may be installed by any method known to those skilled in the art. In one or more embodiments, the roofing membrane 12 may be an EPDM based membrane. A portion of the roofing membrane 12 may extend upward on the vertical walls to create an overlapping membrane portion 14. A curb flashing 16 is applied over the vertical walls and the roofing membrane 12, including the overlapping portion 14. Curb flashing 16 includes a cut-out corner area 18 to facilitate the installation and positioning of the tape at the corner. Curb flashing 16 may include an adhesive layer to facilitate adhesion to membrane 12 and the vertical walls, or may be adhered using a solvent based adhesive applied on the curb surface. In one or more embodiments, curb flashing 16 may be similar to fortified flashing laminate 50 discussed below.

As shown, flashing laminate 10 has a generally circular shape and is positioned at the intersection of the outside corner of the vertical walls and the horizontal roof surface. However, it will be appreciated by those skilled in the art that flashing laminate 10 may have any desired shape or configuration without deviating from the scope of the present invention, unless so claimed. Flashing laminate 10 includes a selectively cured polymeric layer made of a vulcanizable material, such as EPDM, and a layer of vulcanized tape adhesive laminated to a bottom surface of the polymeric layer.

A vulnerable area of flashing laminate 10 has been identified as the area over and immediately surrounding the intersection of the vertical wall surfaces and the horizontal roof surface. Therefore, a generally circular fortified area 20 is provided at this portion of flashing laminate 10, and is indicated by dashed lines in FIG. 1. Fortified area 20 is spaced from an outer edge of the flashing laminate 10, and is smaller in size than the polymeric layer. The fortified area 20 is cured to reinforce and strengthen the flashing laminate at a point of weakness. The green nature of the remainder of the polymeric layer of flashing laminate 10 facilitates installation by rendering the flashing laminate formable, thereby allowing it to conform to the underlying shape of the roofing system, while the cured portion of fortified area 20 protects against damage to the flashing laminate. The uncured portion of the polymeric layer cures over time after installation as a result of exposure to elevated temperatures on the roof surface. Flashing laminate 10 is adhered to the roofing membrane 12 and curb flashing 16 by virtue of the adhesive properties of the layer of vulcanized adhesive tape. In certain embodiments, a lap sealant 21 may be applied at part of all of the edge of flashing laminate 10 to further protect against water infiltration.

Figure 2:
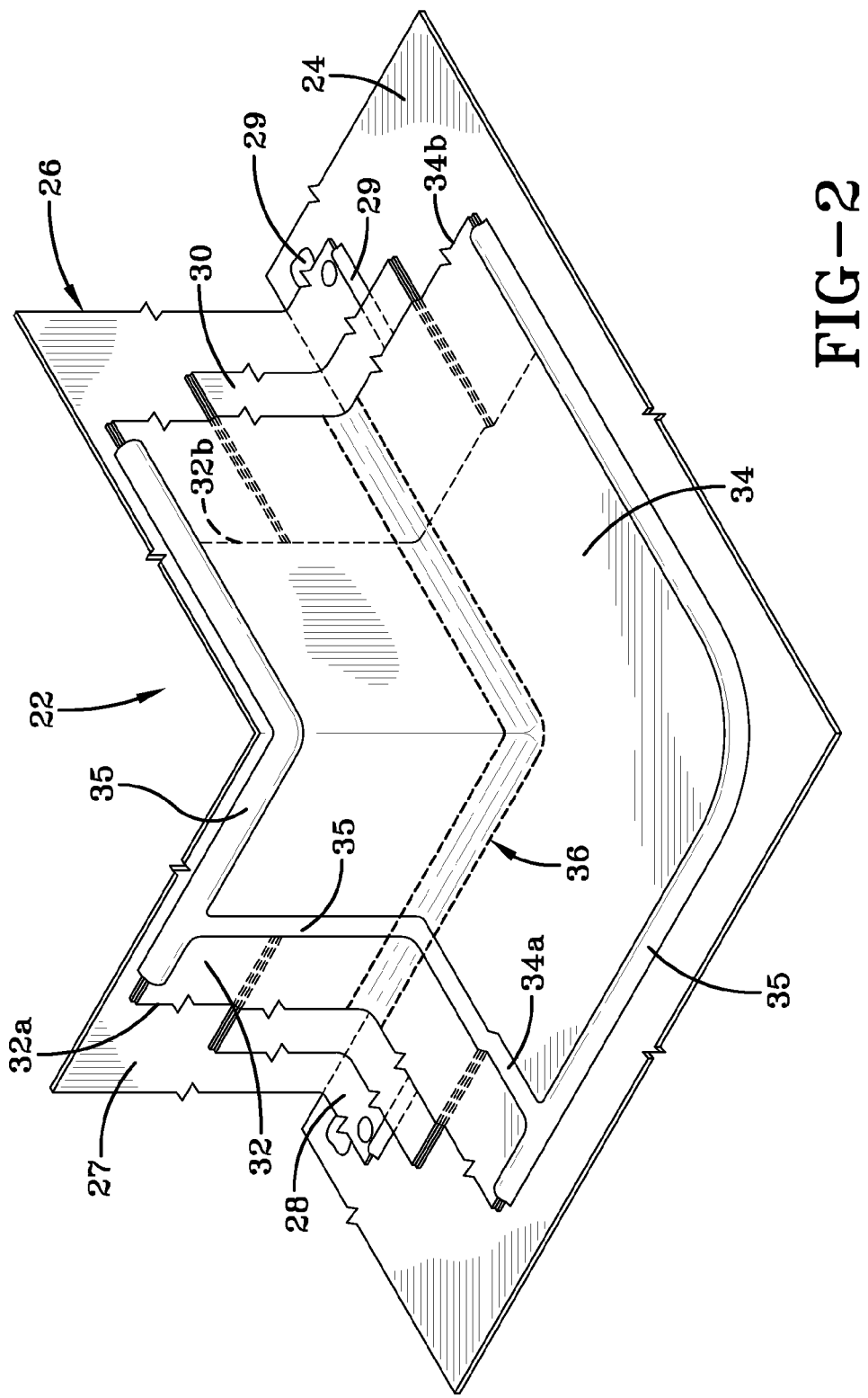
FIG. 2 is an alternative embodiment of a corner flashing installed as part of a roofing membrane assembly.

Referring now to FIG. 2, a flashing laminate assembly is shown, and is generally indicated by the numeral 22. Flashing laminate assembly 22 includes a roofing membrane 24 positioned over the roof surface, which may be installed by any method known to those skilled in the art. In one or more embodiments, roofing membrane 24 may be an EPDM based membrane. A metal curb 26 is positioned at an edge of roofing membrane 24 and includes a vertical portion 27 and a horizontal flange portion 28, which overlies a portion of roofing membrane 24. A sealant 29 may be applied under the horizontal flange portion 28 of metal curb 26 and/or at the edge of horizontal flange portion 28. It is contemplated that the metal curb 26 may be secured to the roof deck or to a wood nailer provided for securing the metal curb, as is known in the art.

A strip of flashing 30 is applied over a portion of the vertical portion 27 of metal curb 26, and over and beyond the horizontal flange portion 28. Flashing 30 may be any known flashing, and may include a pre-applied adhesive to facilitate installation. In one or more embodiments, flashing 30 may be a 5" flashing having a pre-applied adhesive. In other embodiments, a solvent based adhesive may be used to bond flashing 30 to metal curb 26 and roofing membrane 24.

A first wrap of corner flashing laminate 32 is applied over flashing 30 and extends beyond the edges of flashing 30 in both the horizontal and vertical directions. First corner flashing 32 wraps from a first side of the vertical corner 32a to the second side of the vertical corner 32b (edge represented by vertical dashed line). First corner flashing 32 includes a polymeric layer and a pre-applied adhesive on a bottom surface thereof. In one or more embodiments, first corner flashing 32 may be a 9" flashing and may extend beyond flashing 30 by several inches at each edge.

A second wrap of corner flashing laminate 34 is applied over first corner flashing 32. Second corner flashing 34 may be identical to first corner flashing 32, and wraps from the first side of the vertical corner 34a to the second side of the vertical corner 34b. Second corner flashing 34 is off-set from first corner flashing 32 so that a portion of first corner flashing adjacent to edge 32a remains exposed, and a portion of second corner flashing adjacent to edge 34b extends beyond first corner flashing 32. In one or more embodiments, a sealant 35 may be applied to the top and bottom edges of first and second corner flashings 32 and 34 and at the edge of second corner flashing 34a.

A fortified area 36 on each of corner flashing laminates 32 and 34 exists at the area where the flashings bend between the horizontal roof surface and the metal curb, shown in FIG. 2 by dashed lines. This fortified area is selectively cured prior to installation to strengthen and fortify this area of the flashing laminate. The fortified area 36 on each flashing laminate is in the form of a generally longitudinally extending section of the flashing, and is spaced from the longitudinal edges of the polymeric layer. As will be appreciated by those skilled in the art, fortified area 36 is smaller in size than the flashing laminates 32 and 34. The green nature of the uncured portion of the polymeric layer of flashing laminates 32 and 34 facilitates installation by rendering the flashing laminate formable, thereby allowing it to conform to the underlying shape of the roofing system, while the fortified area 36 protects against damage to the flashing laminate at the vulnerable corner portion. The uncured portion of the polymeric layer cures over time after installation as a result of exposure to elevated temperatures on the roof surface.

Figures 3, 3A:
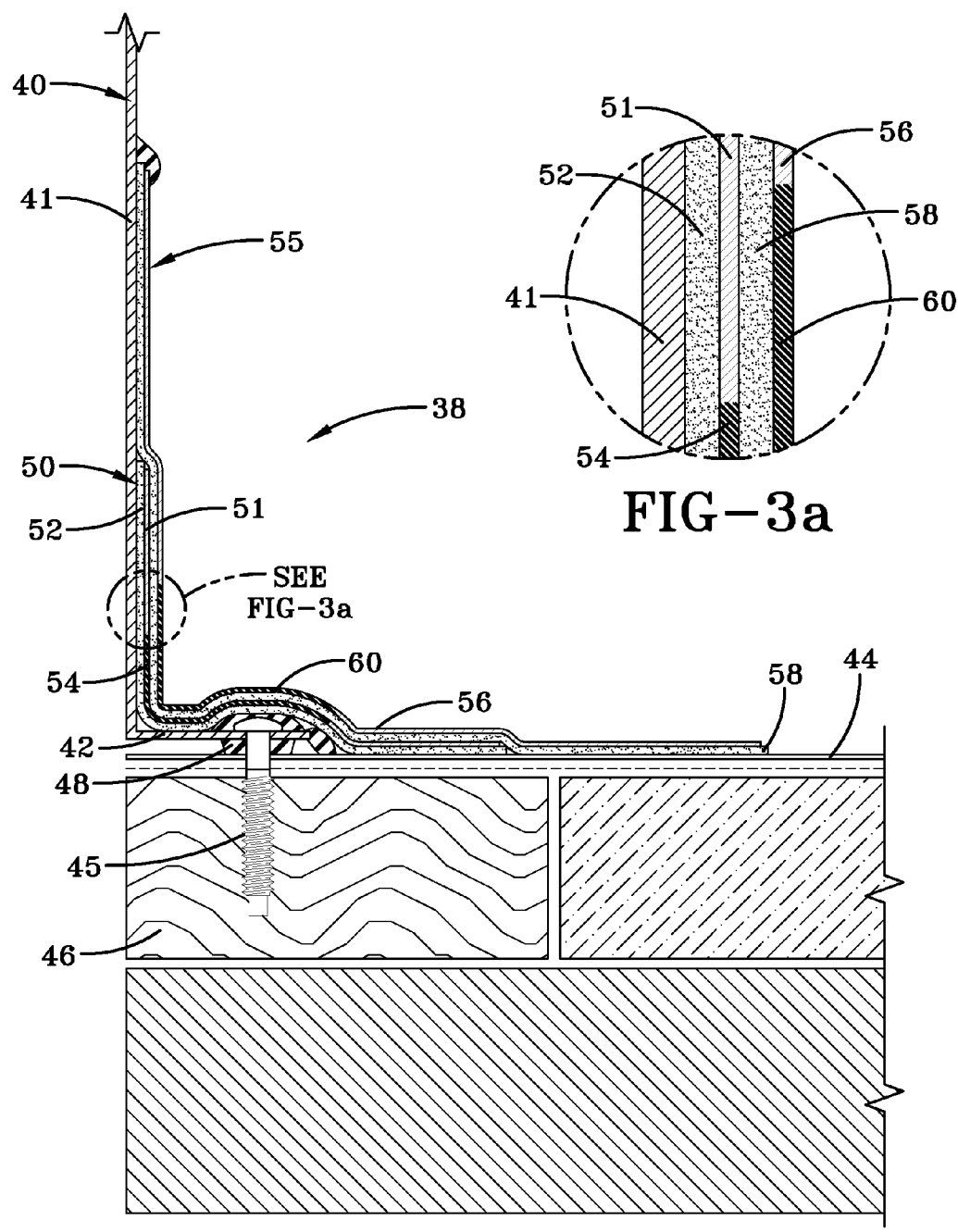
FIG. 3 is a sectional view of a flashing laminate installed at the base of a curb.
FIG. 3a is an enlarged view of a portion of the flashing laminate as indicated in FIG. 3.

Referring now to FIGS. 3 and 3a, a flashing laminate assembly is shown, and is indicated generally by the numeral 38. Flashing laminate assembly 38 is similar to flashing laminate assembly 22, but is not installed at a corner, and therefore includes only a single layer of outer flashing laminate. A metal curb 40, including a vertical portion 41 and a horizontal flange portion 42, is positioned at an edge of a roofing membrane 44. A fastener 45 passes through the horizontal flange portion 42 of metal curb 40 and into a wood nailer 46 (or a roof substrate) to secure the metal curb in place. A sealant 48 is provided around the head of fastener 45 to seal the opening in the horizontal flange portion 42, and at the edge of the horizontal flange portion 42 to form a seal with the roofing membrane 44.

A first flashing laminate 50, including a polymeric layer 51 and a vulcanized adhesive tape layer 52, is positioned over a portion of the vertical portion 41 of metal curb 40, over the horizontal flange 42 of metal curb 40, and over a portion of the roofing membrane 44 adjacent to metal curb 40. In one or more embodiments, first flashing laminate 50 may be a strip of 5" flashing laminate. Polymeric layer 51 is uncured at the time of installation, except for a cured portion 54 that forms a fortified area at the portion of the first flashing laminate 50 that transitions from the horizontal roof surface (roofing membrane 44) to the vertical surface 41 of the metal curb 40. As already discussed, the cured portion 54 of polymeric layer 51 fortifies the first flashing laminate 50 at a vulnerable area. The cured portion 54 of polymeric layer 51 is in the form of a generally longitudinally extending section of the flashing laminate, and is spaced from the longitudinal edges of the polymeric layer. As will be appreciated by those skilled in the art, cured portion 54 is smaller in size than the polymeric layer.

A second flashing laminate 55, including a polymeric layer 56 and a vulcanized adhesive tape layer 58, is positioned over first flashing laminate 50. In one or more embodiments, second flashing laminate 55 may be a strip of 9" flashing laminate, and may be positioned so that it extends approximately 2" beyond each of the edges of the first flashing laminate 50. Polymeric layer 56 is uncured at the time of installation, except for a cured portion 60 that forms a fortified area at the portion of the second flashing laminate 55 that transitions from the horizontal roof surface (roofing membrane 44) to the vertical surface of the metal curb 40, which is partially covered by the first adhesive flashing laminate 50. The cured portion 60 of polymeric layer 56 strengthens the second flashing laminate 55 at the vulnerable transition area between the horizontal roof surface and the vertical surface of the metal curb. The cured portion 60 of polymeric layer 56 is in the form of a generally longitudinally extending section of the flashing laminate, and is spaced from the longitudinal edges of the polymeric layer. As will be appreciated by those skilled in the art, cured portion 60 is smaller in size than the polymeric layer.

Figure 4:
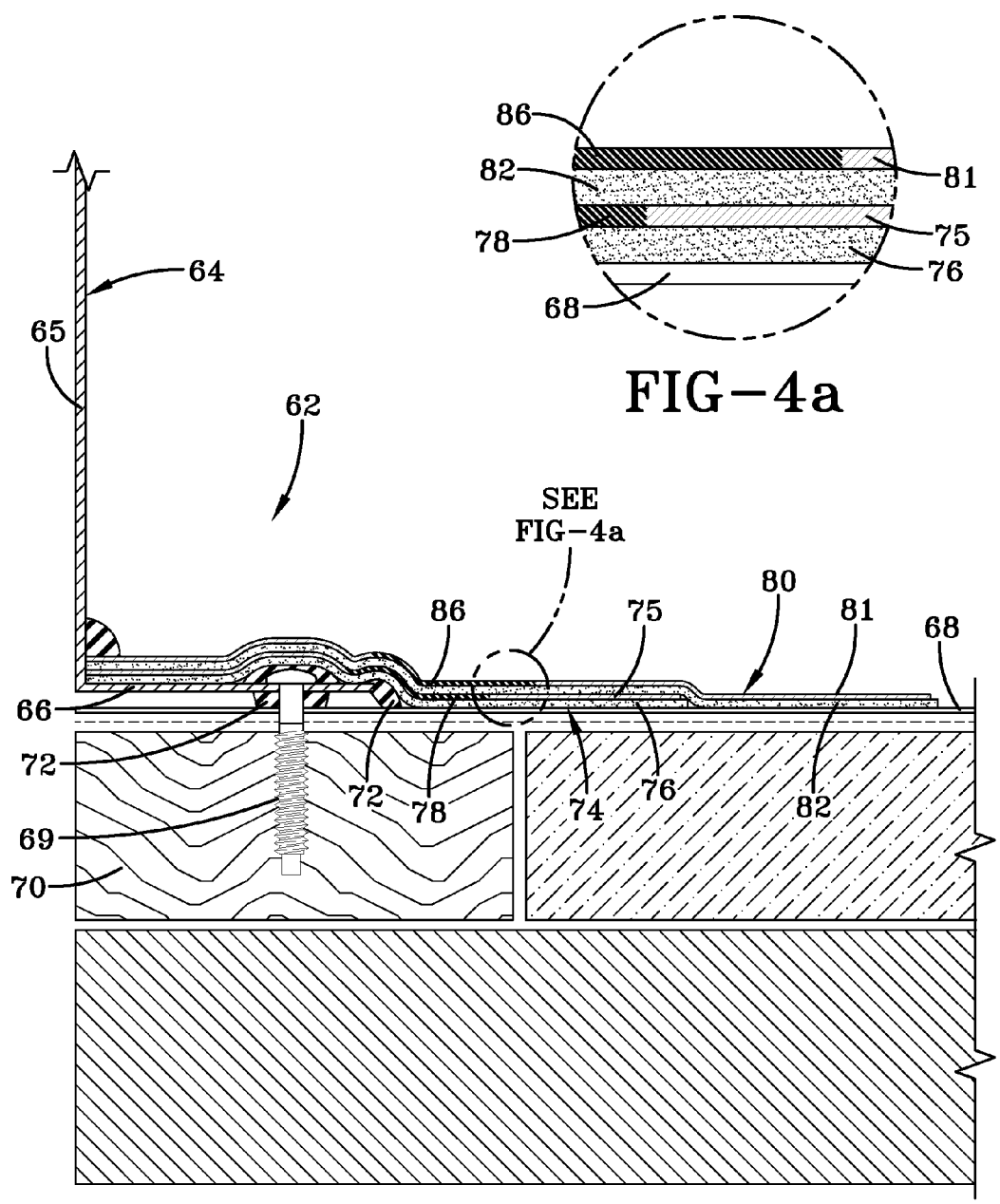
FIG. 4 is an alternate embodiment of a flashing laminate installed at the base of a curb.

Referring now to FIGS. 4 and 4a, a flashing laminate assembly is shown, and is indicated generally by the numeral 62. Flashing laminate assembly 62 is similar to flashing laminate assembly 38. A metal curb 64, including a vertical portion 65 and a horizontal flange portion 66, is positioned at an edge of a roofing membrane 68. In one or more embodiments, a fastener 69 passes through the horizontal flange portion 66 of metal curb 64 and into a wood nailer 70 (or roof substrate) to secure the metal curb in place. A sealant 72 is provided around the head of fastener 69 to seal the opening in the horizontal flange portion 66, and at the edge of the horizontal flange portion 66 to form a seal with the roofing membrane 68.

A first flashing laminate 74, including a polymeric layer 75 and a vulcanized adhesive tape layer 76, is positioned over the horizontal flange portion 66 of metal curb 64, and over a portion of the roofing membrane 68 adjacent to metal curb 64. In one or more embodiments, first flashing laminate 74 may be a strip of 5" flashing laminate. Polymeric layer 75 is uncured at the time of installation, except for a cured portion 78 that forms a fortified area at the portion of the first flashing laminate 74 that transitions from the horizontal roof surface (roofing membrane 68) to the horizontal flange portion 66 of the metal curb 64. The cured portion 78 of polymeric layer 75 fortifies the first flashing laminate 74 at the vulnerable transition area. The cured portion 78 of polymeric layer 75 is in the form of a generally longitudinally extending section of the flashing laminate, and is spaced from the longitudinal edges of the polymeric layer. As will be appreciated by those skilled in the art, cured portion 78 is smaller in size than the polymeric layer.

A second flashing laminate 80, including a polymeric layer 81 and a vulcanized adhesive tape layer 82, is positioned over first flashing laminate 74. In one or more embodiments, second flashing laminate 80 may be a strip of 9" flashing laminate, and may be positioned so that it extends approximately 4" beyond the edge of first flashing laminate 74 on roofing membrane 68. Polymeric layer 81 is uncured at the time of installation, except for a cured portion 86 that forms a fortified area at the portion of the second flashing laminate 80 that transitions from the horizontal roof surface (roofing membrane 68) to the horizontal flange portion 66 of the metal curb 64, which is covered by the first adhesive flashing laminate 74. The cured portion 86 of polymeric layer 81 strengthens the second flashing laminate 80 at the vulnerable transition area. The cured portion 86 of polymeric layer 81 is in the form of a generally longitudinally extending section of the flashing laminate, and is spaced from the longitudinal edges of the polymeric layer. As will be appreciated by those skilled in the art, cured portion 86 is smaller in size than the polymeric layer.

Figure 5:
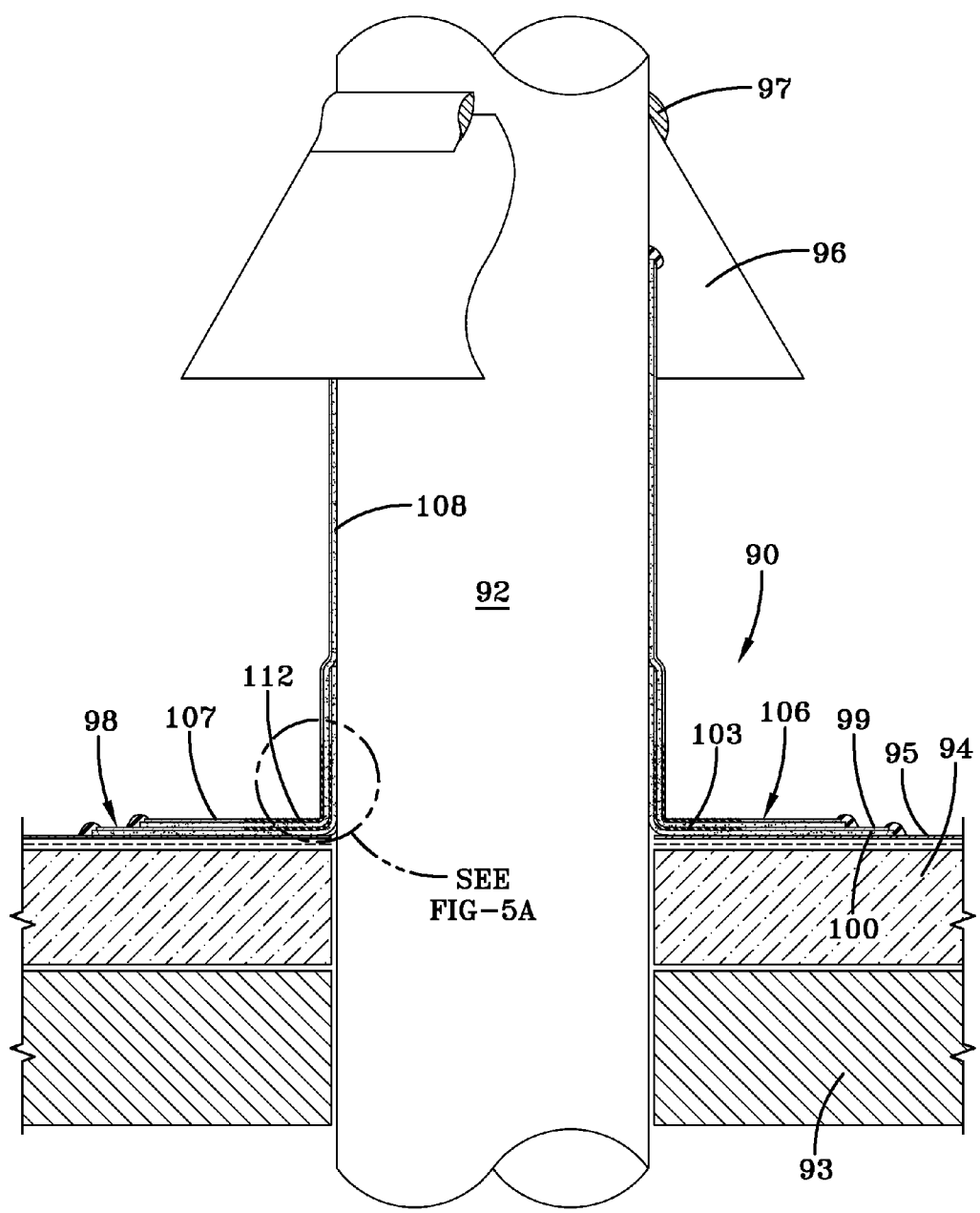
FIG. 5 is a sectional view of a flashing laminate installed around a roofing penetration.
Figure 5A:
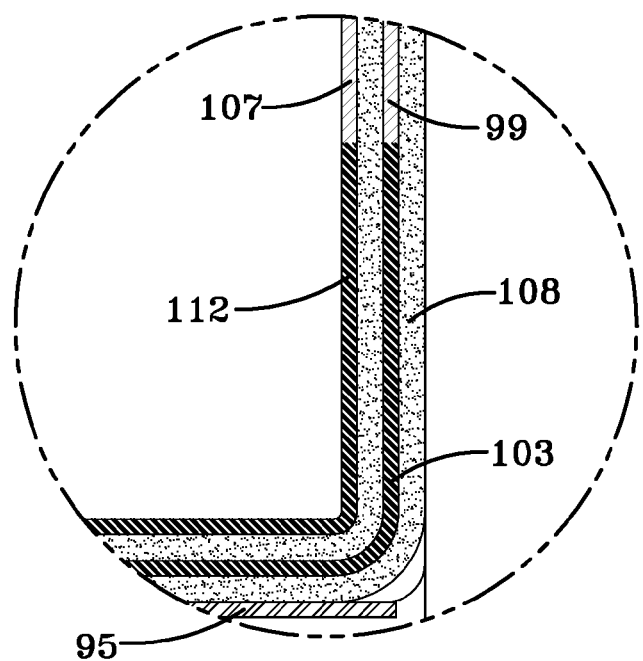
FIG. 5a is an enlarged view of a portion of the flashing laminate as indicated in FIG. 5.

Referring now to FIGS. 5 and 5a, a flashing laminate assembly is shown, and is indicated generally by the numeral 90. Flashing laminate assembly 90 is installed around a roof penetration 92, which may be an exhaust pipe, as shown in the drawing. However, it is contemplated that flashing laminate assembly 90 could be utilized to seal a roofing system around any type of roof penetration known to those skilled in the art. Roof penetration 92 extends upward through a roof deck 93, an insulation board 94, and a roofing membrane 95. A hood 96 may optionally be provided adjacent the top of the penetration to direct precipitation away from the seams of the flashing laminate assembly 90, and where provided, a sealant 97 may be included at a top edge of hood 96 to prevent water infiltration between the hood and the penetration.

A first flashing laminate 98, including a polymeric layer 99 and a vulcanized adhesive tape layer 100, is positioned around roof penetration 92 at the intersection with roofing membrane 95. A portion of first flashing laminate 98 extends vertically on the exterior of the roof penetration 92, and a second portion extends horizontally over roofing membrane 95. In one or more embodiments, first flashing laminate 98 may be a strip of 5" flashing laminate. Polymeric layer 99 is uncured at the time of installation, except for a cured portion 103 that forms a fortified area at the corner portion of the first flashing laminate 98 that transitions from roofing membrane 95 to roof penetration 92. The cured portion 103 of polymeric layer 99 strengthens the first flashing laminate 98 at the vulnerable transition area between the roofing membrane 95 and the penetration 92. The cured portion 103 of polymeric layer 99 is in the form of a generally longitudinally extending section of the flashing laminate, and is spaced from the longitudinal edges of the polymeric layer. As will be appreciated by those skilled in the art, cured portion 103 is smaller in size than the polymeric layer.

A second flashing laminate 106, including a polymeric layer 107 and a vulcanized adhesive tape layer 108, is positioned over first flashing laminate 98. In one or more embodiments, second flashing laminate 106 may be a 9" flashing laminate, and may be positioned so that it extends up the outer surface of roof penetration 92 beyond the top edge of first flashing laminate 98. Polymeric layer 107 is uncured at the time of installation, except for a cured portion 112 that forms a fortified area at the corner portion of the second flashing laminate 106 that transitions from roofing membrane 95 to roof penetration 92, which is covered by the first adhesive flashing laminate 98. The cured portion 112 of polymeric layer 107 strengthens the second flashing laminate 106 at the transition area created by the intersection of the roofing membrane 95 and the penetration 92. The cured portion 112 of polymeric layer 107 is in the form of a generally longitudinally extending section of the flashing laminate, and is spaced from the longitudinal edges of the polymeric layer. As will be appreciated by those skilled in the art, cured portion 112 is smaller in size than the polymeric layer.

Figure 6A:
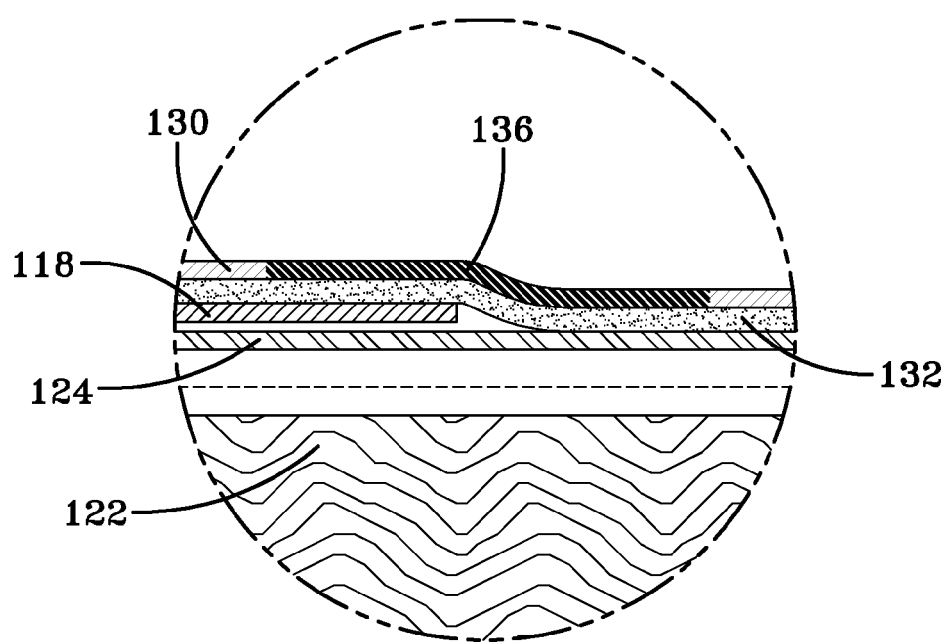
FIG. 6a is an enlarged view of a portion of the flashing laminate as indicated in FIG. 6.

Referring now to FIGS. 6 and 6a, a flashing laminate assembly is shown and is indicated generally by the numeral 115. Flashing laminate assembly 115 is installed at the edge of a roofing membrane 116 and over a gutter flange 118 extending from a gutter 120 secured to a wood nailer 122. Roofing membrane 116 extends over the edge of the wood nailer 122 and includes an overhang portion 124 that covers the vertical exterior face of the roof deck. The gutter flange 118 extends upward from the gutter, and then over the horizontal portion of the roofing membrane 116. The gutter 120 and gutter flange 118 are secured by fasteners 125 and 126, respectively.

A flashing laminate 128, including a polymeric layer 130 and a vulcanized adhesive tape layer 132, is positioned over the edge of the gutter flange 118 to seal the seam between the flange 118 and the roofing membrane 116. In one or more embodiments, flashing laminate 128 may be a 5" flashing laminate. Polymeric layer 130 is uncured at the time of installation, except for a cured portion 136 that forms a fortified area at the portion of the flashing laminate 128 that transitions from roofing membrane 116 to gutter flange 118. The cured portion 136 of polymeric layer 130 strengthens the flashing laminate 128 at the vulnerable transition area between the roofing membrane 116 and the gutter flange 118. In one or more embodiments, a sealant 138 may be provided at each edge of flashing laminate 128 to further seal against water infiltration. The cured portion 136 of polymeric layer 130 is in the form of a generally longitudinally extending section of the flashing laminate, and is spaced from the longitudinal edges of the polymeric layer. As will be appreciated by those skilled in the art, cured portion 136 is smaller in size than the polymeric layer.

Although the embodiments discussed herein include an adhesive layer covering at least a portion of the bottom surface of the polymeric layer, it is also contemplated that in certain embodiments a fortified flashing having cured and uncured portions may be provided without an adhesive layer. In these embodiments, a solvent based adhesive may be used to secure the fortified flashing in place in a roof system, as is known to those skilled in the art.

Various modifications and alterations that do not depart from the scope and spirit of this invention will become apparent to those skilled in the art. This invention is not to be unduly limited to the illustrative embodiments set forth herein.

What is claimed is:

1. A fortified flashing laminate for on-site installation comprising:
    a single unreinforced yet formable polymeric layer having an uncured portion and an at least partially cured portion forming a fortified area, wherein said cured and uncured portions are along the same plane prior to installation; and
    a layer of adhesive tape covering at least a portion of said bottom surface of said polymeric layer.

2. The fortified flashing laminate of claim 1, wherein said layer of adhesive tape covers substantially all of said bottom surface of said polymeric layer.

3. The fortified flashing laminate of claim 1, wherein said layer of adhesive tape covers the entire bottom surface of said polymeric layer.

4. The fortified flashing laminate of claim 1, wherein said layer of adhesive tape is a vulcanized adhesive tape.

5. The fortified flashing laminate of claim 1, wherein the layer of adhesive tape includes at least 85% solids.

6. The fortified flashing laminate of claim 1, further comprising a release liner positioned over said layer of adhesive tape.

7. The fortified flashing laminate of claim 1, wherein said polymeric layer is generally circular in shape.

8. The fortified flashing laminate of claim 7, wherein said at least partially cured portion of said polymeric layer is generally centered on and spaced from an outer edge of said polymeric layer.

9. The fortified flashing laminate of claim 1, wherein said at least partially cured polymeric layer is in the form of a longitudinally extending strip having longitudinal edges and a width.

10. The fortified flashing laminate of claim 9, wherein said at least partially cured portion of said polymeric layer is a longitudinally extending section of said polymeric layer having a width less than the width of said polymeric layer.

11. The fortified flashing laminate of claim 10, wherein said at least partially cured portion is spaced from the longitudinal edges of said polymeric layer.

12. The fortified flashing laminate of claim 1, wherein said cured portion of said polymeric layer has a tensile strength of greater than 1100 psi.

13. The fortified flashing laminate of claim 1, wherein said uncured portion of said polymeric layer has a tensile strength of less than 250 psi.

14. The fortified flashing laminate according to claim 1, wherein said at least partially cured portion is fully cured.

15. The fortified flashing laminate of claim 1, wherein said cured and uncured portions are installed in different planar orientations and said uncured portion fully cures over time.

16. A roof assembly comprising:
    a roofing membrane secured over a roof deck;
    a curb flashing applied to a vertical surface adjacent said roof deck; and
    a flashing laminate including (i) a single unreinforced thermosetting polymeric layer having a top surface and a bottom surface, and including an uncured portion and an at least partially cured portion that forms a fortified area, wherein said cured and uncured portions are along the same plane prior to installation and (ii) a layer of adhesive tape covering substantially all of said bottom surface of said polymeric layer, wherein said fortified area of said flashing laminate is positioned at a seam between said curb flashing and said roofing membrane; and wherein said flashing laminate is fully cured after installation.

17. The roof assembly of claim 16, wherein said layer of adhesive tape covers the entire bottom surface of said polymeric layer.

18. The roof assembly of claim 16, wherein said layer of adhesive tape is a vulcanized adhesive tape.

19. The roof assembly of claim 16, wherein the layer of adhesive tape includes at least 85% solids.

20. The roof assembly of claim 16, further comprising a release liner positioned over said layer of adhesive tape.

21. The roof assembly of claim 16, wherein said cured portion of said polymeric layer has a tensile strength of greater than 1100 psi.

22. The roof assembly of claim 16, wherein said uncured portion of said polymeric layer has a tensile strength of less than 250 psi.

23. The roof assembly according to claim 16, wherein said at least partially cured portion is fully cured.

24. The roof assembly of claim 16, wherein said fully cured flashing laminate is in different planes.

25. A method of making and installing a flashing laminate comprising the steps of:
- forming a single polymeric sheet having a top surface and a bottom surface; selectively curing a portion of the polymeric sheet to form an at least partially cured portion, wherein said at least partially cured portion is in the same plane as any uncured portion;
- laminating a layer of vulcanized adhesive tape to the bottom surface of the polymeric sheet;
- installing said polymeric sheet on a roof deck; and
- curing the remainder of said polymeric sheet.

26. The method of claim 25, further comprising the step of securing a release liner over the layer of adhesive tape.

27. The method of claim 25, wherein the step of selectively curing is performed by applying heat to a portion of the polymeric sheet.

28. The method of claim 25, wherein the step of selectively curing is performed by applying heat to a portion of the polymeric sheet for at least 15 minutes prior to the step of laminating.

29. The method of claim 25, wherein the step of selectively curing is performed by subjecting a portion of the polymeric sheet to radiation.

30. The method of claim 25, wherein the step of selectively curing is performed by applying additional curatives to a portion of the polymeric sheet.

31. The method according to claim 25, further comprising: fully curing said at least said partially cured portion.

32. The method of claim 25, wherein the step of installing said polymeric sheet orients said polymeric sheet in different planes.

33. A fortified flashing for on-site installation comprising a single vulcanizable polymeric layer including an at least partially cured portion and an uncured portion, wherein said cured and uncured portions are along the same plane prior to installation, the at least partially cured portion forming less than approximately 50% of the polymeric layer, wherein the at least partially cured portion of the polymeric layer is characterized by a tensile strength of at least approximately 1200 PSI, and the uncured portion is characterized by a tensile strength of less than approximately 300 PSI.

34. The fortified flashing of claim 33, wherein the cured portion is characterized by a maximum tensile set of 10% and the uncured portion is characterized by a minimum tensile set of 80%.

35. The fortified flashing according to claim 33, wherein said at least partially cured portion is fully cured.

36. The fortified flashing of claim 33, wherein said at least partially cured portion is fully cured so that the polymeric layer is in different planes.

* * * * *